Feb. 14, 1939.   J. B. A. DE BOYSSON   2,147,334
PUMPING UNIT WITH AUTOMATIC CLUTCH
Filed Aug. 9, 1937

J. B. A. de Boysson, Inventor
By: Glascock Downing & Seebold, Attys.

Patented Feb. 14, 1939

2,147,334

UNITED STATES PATENT OFFICE 2,147,334

PUMPING UNIT WITH AUTOMATIC CLUTCH

Joseph Bernard Antoine de Boysson,
Paris, France

Application August 9, 1937, Serial No. 158,205
In France October 24, 1936

2 Claims. (Cl. 103—23)

This invention relates to a pumping unit having means which acts for clutching and for declutching, said unit being devised for producing hydraulic power for any use.

The unit according to said invention is more particularly characterized by the fact that the rotary part of the pump as a whole is slidably mounted on its carrying shaft for obtaining either the clutching or the declutching under the control of a hydraulic ram and of an opposed spring with a view to secure said clutching without the help of sliding keys, grooves or like members.

Figure 1:
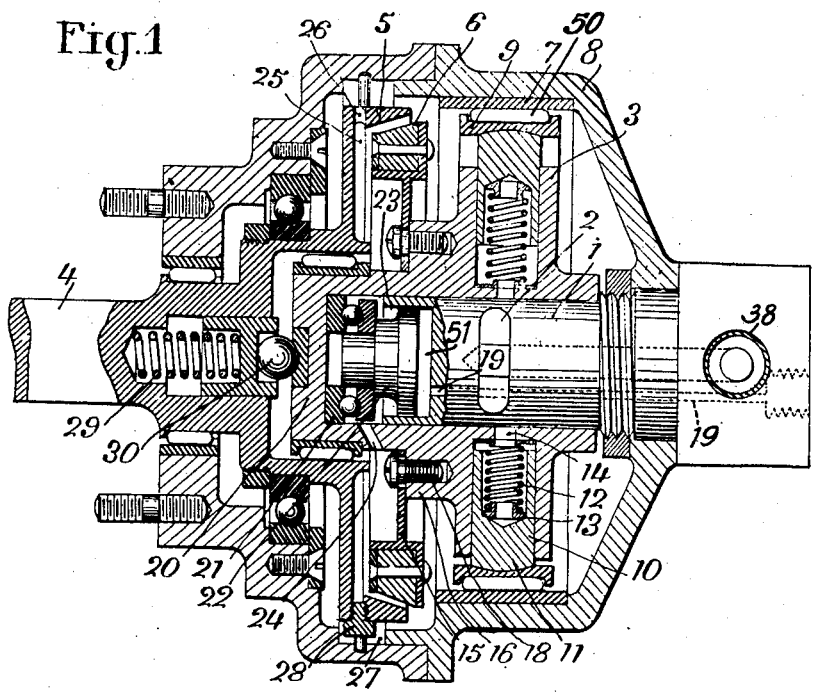
Figure 2:
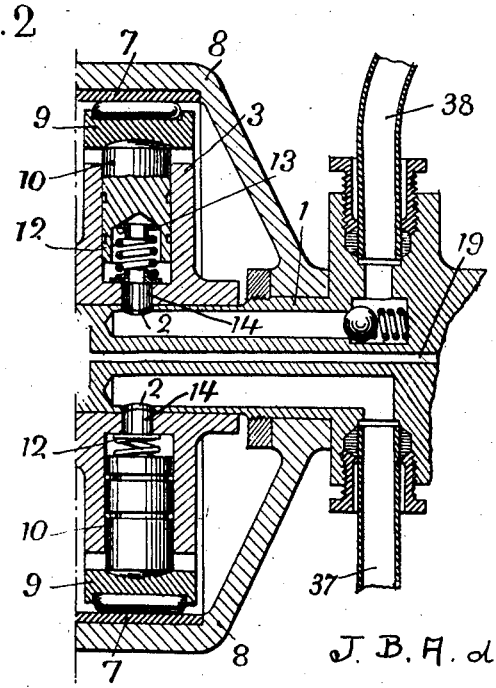

In the accompanying drawing there is shown by way of example an embodiment of a pumping unit according to said invention:

Fig. 1 is a longitudinal axial section of the pumping unit according to said invention, Fig. 2 is a part of a longitudinal axial section taken at right angles to the apparatus illustrated in Fig. 1.

The pump itself is provided with a number of radial cylinders the group of which is rotatably mounted on a stationary shaft 1 provided with two elongated orifices 2, one of which is shown in Fig. 1. 3 is the group of cylinders which may rotate on the shaft 1. 4 is the driving shaft which is provided with one clutch member, namely the female cone 5.

Located on the block or group of cylinders 3 is the other clutch member, or the male cone 6. The clutching is obtained by causing the group of cylinders 3 to slide towards the left hand side in Fig. 1, which brings the male cone 6 in intimate contact with the female cone 5. In order to make the translating movement easier, the eccentric constituting the abutment of the pistons is formed by a stationary ring 7 which is fixed to the casing 8 of the pump, and an idle ring 9, and these rings constitute the external race and the internal race respectively of a roller or needle bearing 50. The position of the idle ring which constitutes the internal race 9 is determined by the abutment of pistons 10 provided each with a spherical head 11. Springs 12 push said piston heads 11 against an internal groove of the idle ring 9. The shapes of the spherical heads of pistons, and of their receiving grooves are such that the resultant of the reactions is never centered relatively to the pistons so that said pistons rotate about their own axes during revolution of the group of cylinders 3 and while said pistons are performing their reciprocating longitudinal movement. This results in securing a very regular contact of the pistons in their cylinders and consequently in improving the tightness of said pistons. The pushing effort must be sufficient for the position of the idle ring 9 relatively to the plan of cylinder group 3 to be strictly defined and for the idle ring to follow the translating movement of the cylinder group 3. The external ends of the springs 12 are each provided with abutment rings 13.

The stationary ring 7 has a sufficient length (measured in the direction of the shaft 1) for guiding the bearing 50 from the idle position to the clutched position. The orifices 2 of the guide are provided at a convenient place as to be brought in front of orifices 14 of the cylinders when the pump is clutched.

The male cone 6 is arranged on a disc 15 which is secured to the cylinders 3 by means of screws 18 extending through openings in the disc and engaging threaded apertures provided in the abutments 16. Axial translation of the cylinders on the shaft 1 to cause engagement of the clutch may be accomplished by means of hydraulic pressure introduced through a channel 19 provided in the stationary shaft. The hydraulic pressure may be derived from a supply (not shown) so as to apply a force to the cap shaped end 20 of the rotatable part or block carrying the cylinders 3. In other words, the hydraulic pressure is introduced into the space 51 and acts on the piston 22. The piston 22 is mounted in a cylinder 23 and the force acting thereon is transmitted through the ball bearing 21 to move the cylinders to the left in Figure 1 and cause engagement of the clutch members. An opening or hole 24 may be provided in the cylinder 23 to permit any fluid that may leak past the piston 22 to escape.

When a hole 24 is used it is necessary to provide for draining means.

For that purpose a recess 25 is provided in the female cone 5 in communication with the external space by means of an orifice 26. A circular chamber 27 provided in the casing, and a series of wings 28 located on the female cone 5, constitute a centrifugal pump, for moving the fluid in the chamber 27 out of the casing by means of a suitably arranged canal not shown in the drawing.

The draining of liquid is thus secured not only during the operation of the pump, but also when the pump is not in action, since the wings 28 are located on the driving shaft 4 which is constantly rotating.

Movement of the cylinders to the declutching position is effected by means of a spring 29 (Fig. 1) which bears on the shaft 4 and urges the cylinder group 3 to the right (Fig. 1) by pressing on a ball 30.

The cylinders 3 may be coupled to revolve with the driving shaft 4 by inducting fluid pressure into the space 51 as hereinbefore described, and the pistons 10 will therefore reciprocate in the cylinders by means of the eccentrically shaped ring 7. The fluid to be pumped enters the pipe 37 and is drawn into the cylinders. Inward movement of each piston forces the liquid from the cylinders which is delivered through the pipe 38.

While the invention has been described as providing an arrangement for the axial translation of the cylinders, it will be apparent that modifications may be made by those skilled in the art. Such modifications may be made without departing from the spirit and scope of the invention as set forth in the appended claims.

What I claim is:

1. In a device for producing hydraulic power, a driving shaft, a stationary shaft, a plurality of radially arranged cylinders rotatably mounted on said stationary shaft and all of said cylinders being adapted to be axially moved as a unit on the stationary shaft, a piston arranged for longitudinal reciprocation in each cylinder, a spring for moving each piston radially outwards, a clutch member carried by the driving shaft, another clutch member carried by said cylinders, said stationary shaft having a channel therein for introducing fluid pressure to the end of the stationary shaft, means associated with the end of the stationary shaft for moving the clutch members into engagement in response to the fluid pressure applied to the end of the stationary shaft whereby the cylinders are rotated by the driving shaft and a stationary ring having an eccentric race for moving the pistons radially inwards.

2. In a pump unit, a driving shaft, a stationary shaft, a plurality of radially arranged cylinders rotatably mounted on the stationary shaft so as to be axially moved as a unit thereon, a piston movably mounted in each cylinder, a spring for urging each piston radially outward in the respective cylinder, a clutch member carried by the driving shaft, a second clutch member carried by said cylinders, said stationary shaft having a a channel therein for guiding fluid pressure to the end thereof, means associated with the end of the stationary shaft for moving the clutch members into engagement in response to the fluid pressure applied at the end of the stationary shaft so that the cylinders are rotated by the driving shaft, a stationary ring having a width greater than the axial displacement of the cylinders having an eccentric race for moving the pistons radially inward.

JOSEPH BERNARD ANTOINE
DE BOYSSON.